C. G. Moreman.
Corn Harvester.
No. 57,360. Patented Aug. 21, 1866.

Attest
James H. Layman
Henry G. Webber

Inventor.
Charles G. Moreman
By Knight Bros Attys

UNITED STATES PATENT OFFICE.

CHARLES G. MOREMEN, OF BRANDENBURG, KENTUCKY.

IMPROVEMENT IN CORN-HARVESTERS.

Specification forming part of Letters Patent No. 57,360, dated August 21, 1866.

*To all whom it may concern:*

Be it known that I, CHARLES G. MOREMEN, of Brandenburg, Meade county, Kentucky, have invented certain new and useful Improvements in Corn-Harvesters; and I do hereby declare the following to be a full, clear, and exact description thereof, reference being had to the accompanying drawings, making part of this specification.

The object of this improvement is to provide a simple, cheap, and effective machine for harvesting standing corn and depositing the same on the ground in gavels of suitable size, so as to be convenient for removal into a wagon or stack; and the first part of my invention relates to certain devices for conducting the cut stalks into the cradle.

The second part of my invention refers to devices whereby the driver is enabled to discharge the contents of the cradle onto the ground as soon as it has been sufficiently filled.

Figure 1:
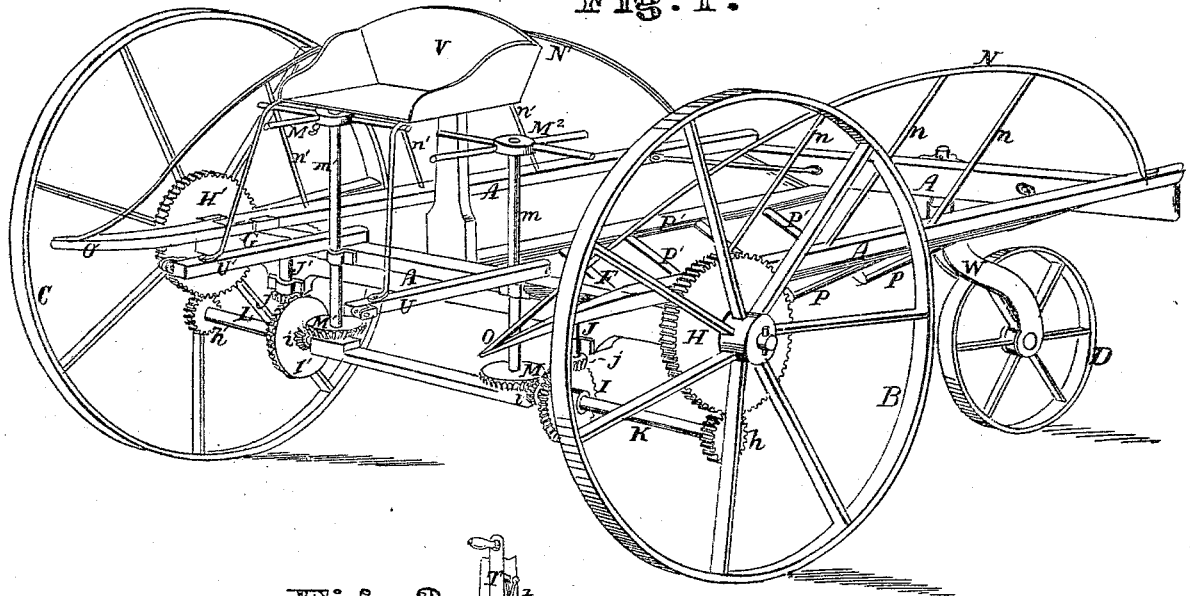
Figure 2:
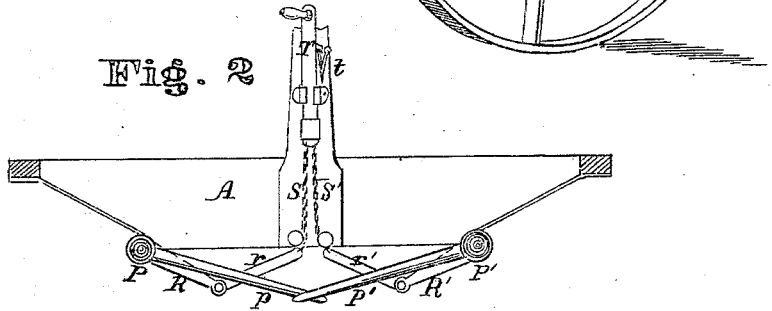

In the accompanying drawings, Figure 1 is a perspective view of a corn-harvester embodying my improvements, and Fig. 2 is a detached view of the devices for emptying the cradle of its contents.

The frame A of the machine is supported on three wheels, B, C, and D, of which the two wheels B C are the front ones, and they impart motion to the operative parts, while the remaining one, D, is simply a trailing wheel.

F and G are two circular cutters revolving in a horizontal plane, which cutters are provided with sickle-shaped teeth, in order that they may sever the stalks in the most expeditious manner, and be readily sharpened by simply grinding the flat side, and motion is communicated from the wheels B C to said cutters by means of the spur-wheels H H' I I' and pinions $h\ h'\ j\ j'$, the last two being secured to the vertical shafts J J' of the cutters F G.

The horizontal shafts K and L, to which the spur-wheels I I' and pinions $h\ h'$ are attached, are provided at their inner ends with pinions $i\ i'$, which gear with spur-wheels M M', the latter being secured to the vertical shafts $m\ m'$, whose upper ends are provided with reels $M^2\ M^3$.

N N' $n\ n'$ are guards or fenders, which prevent the severed corn-stalks from falling off of the machine, and also assist in conducting them into the cradle, and the front ends of said guards terminate in converging gatherers O O', which serve to bring the standing corn in contact with the rapidly-revolving sickle-cutters F and G.

The cradle is composed of two horizontal rock-shafts, P P', which are journaled in the end beams of the frame A, and said shafts are provided with a series of tines, $p\ p'$, which project somewhat beyond the center of the machine, so as to prevent the corn-stalks from accidentally dropping out of said cradle.

The front ends of the rock-shafts P P' are provided with levers R R' and links $r\ r'$, to the latter of which are connected the chains or ropes S S', and the upper ends of said chains are attached to the gravitating slide T, which is held in an elevated position by the spring-catch $t$, the latter being placed where it will be accessible to the driver.

U U' are poles to which the shafts are attached, and V is the driver's seat.

The trailing wheel D supports the rear end of the frame A by means of the swivel-arm W, the wheel being journaled in the lower end of said arm.

Operation: The horse being attached to the harvester, and the driver in position on his seat V, the machine is at once ready for action. The horse is driven into the field so as to walk between two rows of standing corn, and, as the cutters F and G are located on the machine a distance equal to the usual width of the said rows, the converging gatherers O O' conduct the corn into the machine so as to be brought in contact with said cutters. As the machine is drawn over the field a very rapid motion is imparted to the circular cutters F and G, which enable them to sever the standing corn the moment the stalks are brought in contact with them, and the revolving reels $M^2\ M^3$ throw the severed stalks into the cradle P P' $p\ p'$, the fenders N N' $n\ n'$ preventing them from falling off at the sides of the harvester.

When the cradle has been sufficiently filled the driver disconnects the slide T from the spring-catch $t$, and there being no longer anything to support the rock-shafts P P', the weight of the corn resting upon the tines $p\ p'$ causes said rock-shafts to rotate in their journal-bearings, and, as the tines thereby assume a vertical position, the contents of the cradle are immediately deposited on the ground in a gavel of convenient size. The cradle being thus emptied the driver elevates the slide T until it engages with the catch $t$, and by this means restores the cradle to its previously-closed condition, and as the machine continues its course through the field it is filled and emptied in the manner described until all the standing corn has been cut and deposited on the ground in gavels, and the latter may then be easily removed in a wagon.

I claim herein as new and of my invention—

1. The provision, in a corn-harvester, of a cradle consisting of the rock-shafts P P' and tines $p\,p'$, arranged in relation to each other and to the cutters F and G and main frame A, and operating, substantially as described and set forth.

2. In combination with the cradle P P' $p\,p'$, the retaining and liberating mechanism R R', S S', and T $t$, as and for the purpose explained.

In testimony of which invention I hereunto set my hand.

C. G. MOREMEN.

Witnesses:
GEO. H. KNIGHT,
JAMES H. LAYMAN.